F. HAMACHEK.
FEEDER FOR THRESHING MACHINES.
APPLICATION FILED SEPT. 14, 1908.
952,520.
Patented Mar. 22, 1910.
2 SHEETS—SHEET 1.
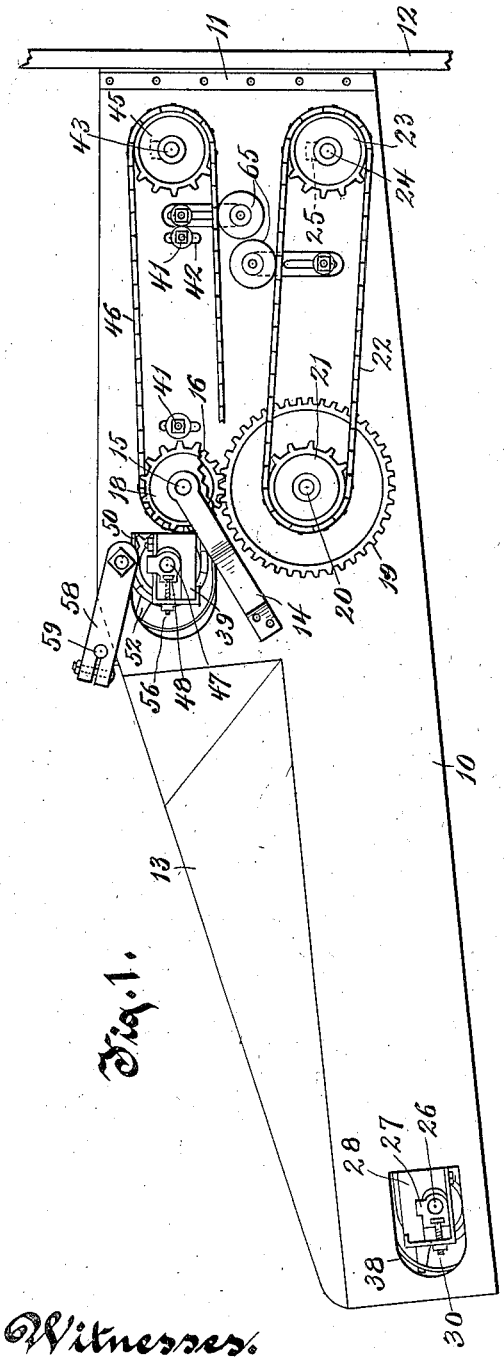
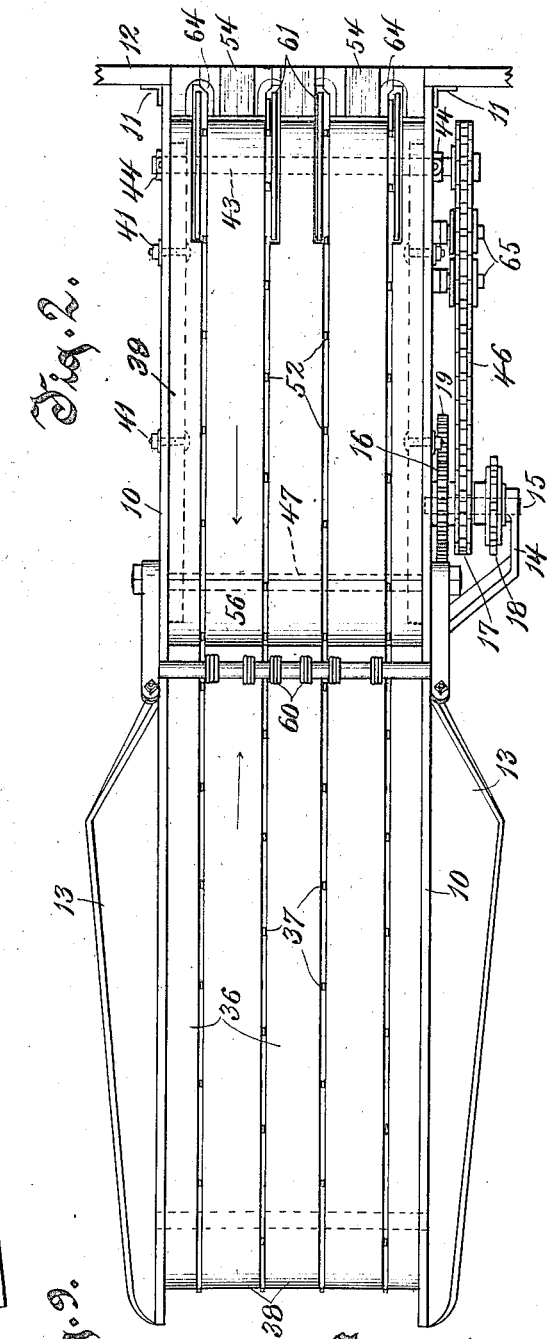
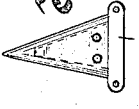
Witnesses.
Inventor.
Frank Hamachek
by Benedict, Morsell &
Caldwell
Attorneys.

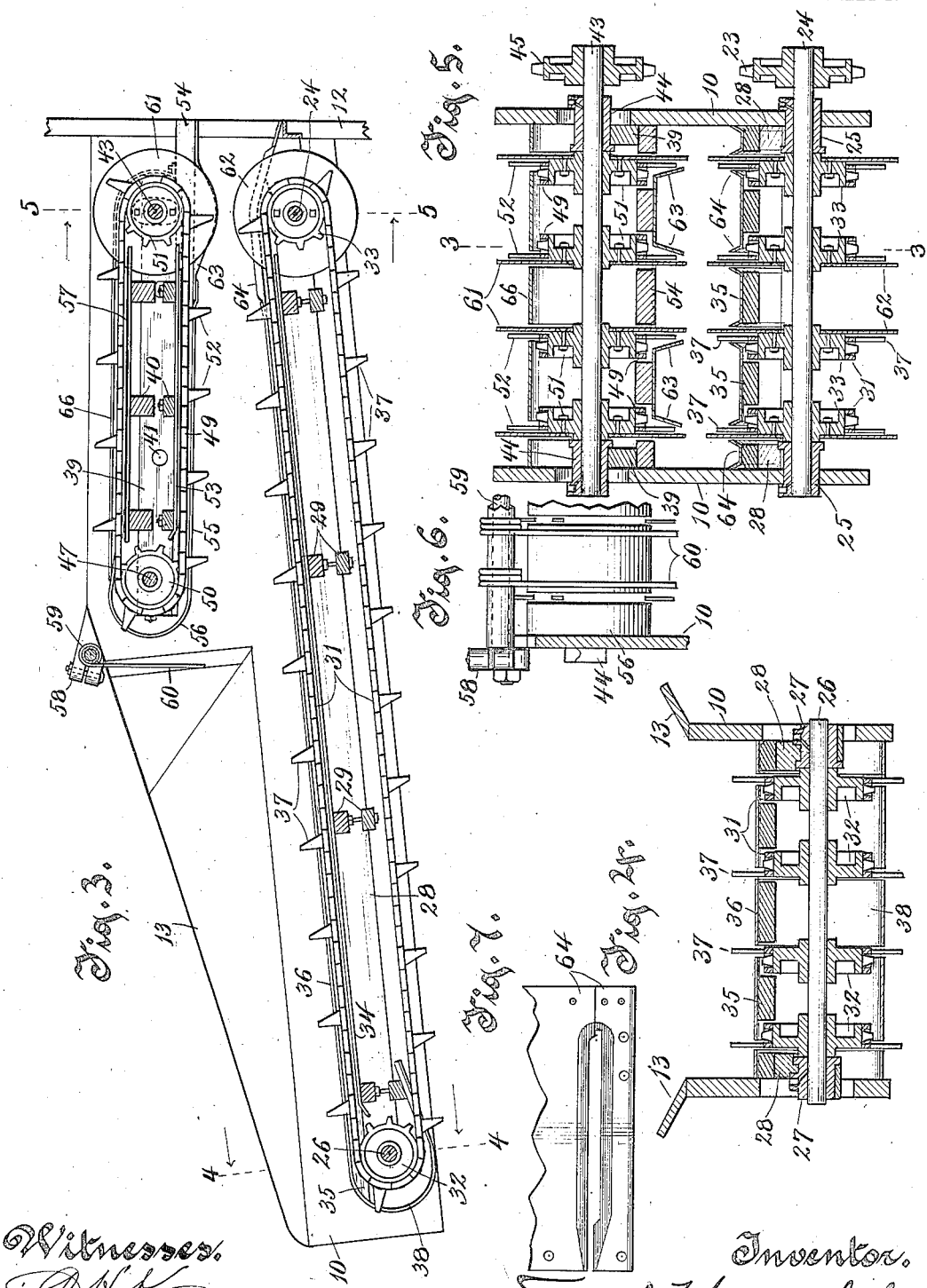

UNITED STATES PATENT OFFICE.

FRANK HAMACHEK, OF KEWAUNEE, WISCONSIN.

FEEDER FOR THRESHING-MACHINES.

952,520.
Specification of Letters Patent. Patented Mar. 22, 1910.
Application filed September 14, 1908. Serial No. 452,931.

*To all whom it may concern:*

Be it known that I, FRANK HAMACHEK, residing in Kewaunee, in the county of Kewaunee and State of Wisconsin, have invented new and useful Improvements in Feeders for Threshing-Machines, of which the following is a description, reference being had to the accompanying drawings, which are a part of this specification.

This invention has for its object to provide mechanism for feeding grain or vine crops to a threshing machine or the like and comprises opposite cutting pronged carriers traveling at different speeds to distribute the material evenly across the feed space.

Another object of the invention is to provide new and efficient means for clearing the teeth of a pronged conveyer of the material carried thereby.

Another object of this invention is to provide means for regulating the quantity of material entering a feeding mechanism for threshing machines and the like.

Another object of the invention is to improve upon details of general construction of feeders for threshing machines and the like.

With the above and other objects in view the invention consists in the feeder for threshing machines herein claimed, its parts and combinations of parts, and all equivalents.

Referring to the accompanying drawings in which like characters of reference indicate the same parts in the several views; Figure 1 is a side elevation of a feeder for threshing machines constructed in accordance with this invention; Fig. 2 is a plan view thereof; Fig. 3 is a longitudinal sectional view thereof; Fig. 4 is a transverse sectional view on the plane of line 4—4 of Fig. 3; Fig. 5 is a similar view on the plane of line 5—5 of Fig. 3 and indicating the sectional plane of Fig. 3 by the line 3—3; Fig. 6 is a detail elevation showing one end of the fender for restricting the supply of material to the feeder; and, Fig. 7 is a detail plan view of the strippers for the teeth of the conveyer. Fig. 8 is a sectional view of one of the teeth of the distributer; and, Fig. 9 is a detail view of a modification thereof.

In these drawings 10 indicates side frames which constitute a casing for inclosing the main parts of the feeder, being provided with attaching strips 11 at the discharge end for connection with the casing 12 of a threshing machine and having a hopper like formation 13 at its receiving end. A bracket 14 is mounted on one side frame and has journaled in it a short shaft 15 which has fixed thereon a gear wheel 16 and two sprocket wheels, 17 and 18 respectively. The sprocket wheel 18 is for driving the distributer, as will be later described, while the sprocket wheel 17 is adapted for connection with some suitable driving mechanism. The gear wheel 16 meshes with a larger gear wheel 19 on a stud 20 of the side frame, said gear wheel 19 carrying a sprocket wheel 21 which is connected by a chain 22 with a sprocket wheel 23 on a shaft 24 which is journaled in bearings 25 in the side frames and extends across the end of the casing. The bearings 25 of shaft 24 are mounted at one end of a conveyer frame with a similar shaft 26 at its other end journaled in bearings 27, the bearings being on the ends of parallel stringers 28 which are connected together at intervals by cross pieces 29 to form a rigid rectangular framework. The bearings 27 are slidably mounted so as to be moved either toward or away from shaft 24 by adjusting means 30 to tighten the conveyer, which is formed of a number of chains 31 traveling around sprocket wheels 32 on shaft 26 and around sprocket wheels 33 on shaft 24. The chains 31 at their upper lengths bear upon metal strips 34 and are guided between wooden strips 35 which form a decking for the conveyer in connection with a metal covering 36. Teeth or arms 37 project from the chains 31 at intervals and ride in slots formed between the strips of the decking, the metal covering 36 being bent in a semi-cylindrical form around the shaft 26 at a distance therefrom to form a guard 38 to practically cover the teeth 37 as they make their upward turn to begin the ascent of the decking, which is preferably arranged on an incline as shown. The object in thus shielding the teeth 37 at the lower end of the decking is to prevent their accidental engagement with the clothing of the attendants.

A distributer frame, comprising stringers 39 and cross pieces 40, is mounted in the casing by having bolts 41 thereon projecting through vertical slots 42 in the side frames 10 so that it may be adjusted toward or away from the conveyer over which it is located. At one end of the distributer frame a shaft 43 is journaled in bearings 44 which project through vertical slots in the side frames 10, as shown in Fig. 5, there being a sprocket wheel 45 on said shaft connected by a chain 46 with the sprocket wheel 17 before mentioned. At the other end of the distributer frame a shaft 47 is journaled in adjustable bearings 48 for tightening the distributer chains 49 which are mounted on sprocket wheels 50 on said shaft and sprocket wheels 51 on shaft 43. These chains also are provided with teeth or projections 52 for engaging the material to be fed to the threshing machine, and to prevent the chains yielding to pressure from beneath them, they have metal strips 53 above them against which they may bear. Like the chains of the conveyer, the chains 49 also ride between wooden strips 54 which are surfaced with strips of sheet metal 55, a guard 56 being formed by the latter around shaft 47 in a similar manner and for a similar purpose to the guard 38. The chains 49 also have bearing strips 57 on the top of the distributer frame on which they may bear on their return movement and strips 66 form a covering for the distributer.

The conveyer being driven from the large gear 19 meshing with the smaller gear 16 of the driving means for the distributer will move more slowly than the distributer and carry the bundles of grain or loose material from the hopper 13 toward the threshing machine and beneath the distributer. The higher portion of the material on the conveyer will be engaged by the teeth 52 of the more rapidly moving distributer and receive a raking action therefrom, which will spread it evenly over the surface of the conveyer, this action becoming effective to a greater depth as the material progresses, on account of the converging relation of the conveyer and the distributer.

To prevent the machine becoming choked by too large a supply of material, a fender is provided in advance of the distributer and comprises a pair of arms 58 pivotally adjustable on the side frames and carrying a rod 59 which is rigidly clamped thereto and is provided with a number of downwardly extending spring fingers 60. The material which passes into the machine is required to travel beneath the fender fingers 60 and they serve to retard the surplus until the material beneath has passed into the machine. Thus, by adjusting the position of the arms 58, the quantity of material fed to the machine may be varied to suit the requirements. Should a mass of material be fed to the machine which is too large to enter the space between the conveyer and the distributer it will be held by the fender 60; and the teeth 37 of the conveyer have their front edges so inclined as to force their way beneath the same without dragging it into the opening until it is reduced. The inclined edge of the teeth 52 of the distributer is rearwardly disposed, so as to have the forward edges positively engage the material so as to produce the raking action for which they are intended.

In order to clear the material from the teeth of the distributer and the conveyer at the mouth of the thresher, the shafts 53 and 24 carry clearing disks 61 and 62 respectively, preferably by having them bolted to their sprocket wheels, the said disks serving by the faster movement of their edges to force the material away from the chains to clear the ends of the teeth and permit the teeth to pass around the sprocket wheels for their return travel. To further assist in thus clearing the material from the teeth of the chains, the strips 54 of the decking of the distributer are provided with curved stripping plates 63, which are preferably arranged as shown in Figs. 3 and 5, with their curved downwardly bent edges standing close to the edges of the disks 61 to form narrow slots therebetween through which the teeth 52 pass in turning around the sprocket wheels 51. Likewise the disks 62 of the conveyer are assisted in their stripping effect by means of plates 64 which, as shown in Fig. 3, are arched over the shaft 24 from the decking of the conveyer to the mouth of the thresher, these plates, as shown in Figs. 5 and 7, having their edges turn upwardly to form protecting flanges to prevent the material following the teeth and the disks below the conveyer. Suitable chain tighteners 65 are adjustably mounted on the side frame 10 where they may engage the chains 22 and 46 to take up slack therein.

In operation, material is fed to the hopper 13 either loose or in bundles and is carried upon the conveyer by the engagement of the teeth 37 therewith, the fender fingers 60 detaining any surplus thereof until the material beneath has passed along. On the material passing the fender it is straightened and distributed by the action of the more rapidly moving teeth 52 of the distributer, said teeth serving to comb or rake the material over the entire surface of the conveyer which latter is prevented from yielding to the material by the bearing strips 53 thereabove, just as the conveyer chains are prevented from yielding by the presence of the bearing strips 34 therebeneath. When the material reaches the clearing disks 61 and 62 it is forced out of engagement with the teeth 52 and 37 so that said teeth may return without it and it is then guided by the plates 64 into the mouth of the threshing machine. As before stated the clearing action of the disks 61 and 62 is facilitated by the plates 63 and 64.

When it is desired to set the distributer at a greater or less distance from the conveyer, according to the quantity and the nature of the material being fed, it is only necessary to adjust the position of the distributer frame by means of the bolts 41 in the slots 42 of the side frame, this change in position being permitted by the movement of the shaft 43 in the elongated openings 44 of the side frames. The driving connection for the distributer is not disturbed by such adjustment as the change takes place between the sprocket wheels 17 and 45 and is permitted by their chain connection which may be tightened if necessary by the chain tightener 65.

By sharpening the front edges of the teeth 52 of the distributer they may serve as band cutters for severing the bands of bundles of grain, the slower moving teeth 37 of the conveyer holding the bundle between them while the sharpened teeth 52 cut the band and spread the material evenly over the full width of the conveyer. The slanting front edges of the teeth 37 of the conveyer prevent their drawing the material down through the slots between the stripper plates 64. Instead of sharpening the front edges of the teeth 52 of the distributer or the teeth 37 of the conveyer to utilize these parts as band cutters as shown in Fig. 8 the said teeth have cutter blades secured thereto in the manner shown in Fig. 9 or in any other desirable way to accomplish this same purpose.

What I claim as my invention and desire to secure by Letters Patent is:

1. A feeder for vine threshing machines and the like, comprising a suitably mounted chain, a shaft carrying a sprocket wheel on which the chain rides, teeth on the chain for engaging material to be fed, and an untoothed disk on the shaft concentric with the sprocket wheel and extending close to the path of the teeth of the chain and beyond the ends thereof to clear the material therefrom by its faster moving edge.

2. A feeder for threshing machines and the like, comprising a suitably mounted chain constituting a conveyer, a shaft having a sprocket wheel around which the chain travels, teeth on the chain for engaging the material to be fed, a disk mounted on the shaft and extending close to the teeth as they pass to clear the material therefrom, and a stripper extending over the shaft and having a slot through which the teeth and the disk pass, the edges of the slot being turned upwardly to form flanges for stripping the material from the teeth and the disk.

3. A feeder for threshing machines and the like, comprising a suitably mounted chain constituting a conveyer, a shaft having a sprocket wheel around which the chain travels, teeth on the chain for engaging the material to be fed, a disk mounted on the shaft and extending close to the teeth as they pass to clear the material therefrom, and a stripper extending over the shaft and having a slot through which the teeth and the disk pass, the edges of the slot being turned upwardly to form flanges for stripping the material from the teeth and the disk, and the front edges of the teeth being inclined to avoid carrying the material through the slot.

4. A feeder for threshing machines and the like, comprising a conveyer, a series of faster moving chains mounted above the conveyer, a shaft having sprocket wheels around which the chains pass, downwardly directed teeth on the chains for engaging the material carried by the conveyer and spreading it over the surface thereof, and disks on the shaft close to the teeth and extending beyond the teeth for stripping the material from the teeth.

5. A feeder for threshing machines, comprising a conveyer, a series of faster moving chains mounted above the conveyer, a shaft having sprocket wheels around which the chains pass, teeth on the chains for engaging the material carried by the conveyer to spread it over the surface thereof, disks on the shaft close to the teeth to strip the material from the teeth, and plates having curved edges also extending close to the teeth to form a slot between them and the disks in which the teeth may withdraw from the material.

6. A feeder for threshing machines, comprising a conveyer, a frame mounted thereabove, shafts journaled in the frame, sprocket wheels on the shafts, a series of faster moving chains mounted on the sprocket wheels, teeth on the chains for engaging the material carried by the conveyer and for spreading it over the surface thereof, strips of sheet metal secured to the frame and forming a bearing surface for the material, said strips being spaced apart to form slots through which the fingers travel and being bent at one end around one of the shafts at a distance therefrom to form a guard for the fingers.

7. A feeder for threshing machines and the like, comprising a casing, a conveyer mounted therein, a distributer frame adjustably mounted in the casing, faster moving chains mounted on the distributer frame, teeth on the chains for engaging the material carried by the conveyer and for spreading it over the surface thereof, and adjustable spring fender fingers in advance of the distributer frame to regulate the quantity of material permitted to pass beneath the distributer frame.

8. A feeder for threshing machines and the like, comprising a casing, an inclined conveyer frame mounted therein, shafts journaled in the conveyer frame, sprocket wheels on the shafts, chains passing around the sprocket wheels, teeth on the chains, a decking mounted on the conveyer frame with slots through which the teeth project, a distributer frame adjustably mounted in the casing, shafts journaled thereon, sprocket wheels on the shafts, distributer chains passing around said sprocket wheels, teeth on the distributer chains for engaging the material carried by the conveyer chains and for spreading it evenly over the decking, and disks on one of the shafts of the conveyer and one of the shafts of the distributer for clearing the material from the teeth of the respective chains.

9. A feeder for threshing machines, comprising a conveyer provided with sharpened teeth to form band cutters in combination with a distributer also provided with sharpened teeth to form band cutters, the teeth of the conveyer and the teeth of the distributer extending toward each other and traveling in the same direction but at different speeds, and disks on the shafts of the conveyer and distributer close to the teeth and extending beyond the teeth for stripping the material from the teeth.

In testimony whereof, I affix my signature, in presence of two witnesses.

FRANK HAMACHEK.

Witnesses:
  R. S. C. CALDWELL,
  ALMA A. KLUG.